US 12,358,386 B2

(12) United States Patent
Chatelus et al.

(10) Patent No.: US 12,358,386 B2
(45) Date of Patent: Jul. 15, 2025

(54) SEALED CABLE FEEDTHROUGH OF A PLUG CONNECTOR

(71) Applicant: Tyco Electronics France SAS, Pontoise (FR)

(72) Inventors: Eric Chatelus, Pontoise (FR); Bruno Dupont, Pontoise (FR); Olivier Pamart, Pontoise (FR); Stephane Gallerand, Pontoise (FR)

(73) Assignee: TE Connectivity Solutions GmbH, Schaffhausen (CH)

( * ) Notice: Subject to any disclaimer, the term of this patent is extended or adjusted under 35 U.S.C. 154(b) by 479 days.

(21) Appl. No.: 17/858,159

(22) Filed: Jul. 6, 2022

(65) Prior Publication Data

US 2023/0009516 A1   Jan. 12, 2023

(30) Foreign Application Priority Data

Jul. 6, 2021  (FR) ..................................... 2107297

(51) Int. Cl.

| H01R 13/52 | (2006.01) |
| B60L 53/16 | (2019.01) |
| B60L 53/18 | (2019.01) |
| H01R 13/639 | (2006.01) |
| H02G 15/013 | (2006.01) |

(52) U.S. Cl.
CPC ............... B60L 53/16 (2019.02); B60L 53/18 (2019.02); H01R 13/5205 (2013.01); H01R 13/6395 (2013.01); H02G 15/013 (2013.01); H01R 13/5202 (2013.01); H01R 2201/26 (2013.01)

(58) Field of Classification Search
CPC ............ H01R 13/5205; H01R 13/6395; H01R 2201/26; H02G 15/013
See application file for complete search history.

(56) References Cited

U.S. PATENT DOCUMENTS

| 2006/0166553 A1 | 7/2006 | Miyakawa |
| 2012/0003860 A1 | 1/2012 | Gossen et al. |
| 2020/0259291 A1* | 8/2020 | Lienert .................... H01R 4/70 |

FOREIGN PATENT DOCUMENTS

| CN | 108539500 A | 9/2018 |
| DE | 102019214955 A1 | 4/2021 |
| JP | 2010218777 A | 9/2010 |
| WO | 2011030187 A1 | 3/2011 |

OTHER PUBLICATIONS

Examination Report from the Office of Intellectual Property of India dated Feb. 7, 2023, corresponding to Application No. 202244037986, 5 pages.
French Search Report and Written Opinion, Application No. FR210297, Dated: Mar. 24, 2022, 22 pages.

\* cited by examiner

Primary Examiner — Briggitte R. Hammond
(74) Attorney, Agent, or Firm — Barley Snyder

(57) ABSTRACT

A sealed cable feedthrough of a plug connector includes a housing having an opening receiving a cable, a cover partially covering the opening, the cover having a through hole receiving the cable along an insertion direction, and a seal member sealing an interface between the housing and the cover. The seal member has a tubular member with a through hole receiving the cable along the insertion direction. The tubular member is arranged within the through hole of the cover and extends along a direction parallel to the insertion direction. The tubular member seals an interface between the cover and the cable.

20 Claims, 4 Drawing Sheets

SEALED CABLE FEEDTHROUGH OF A PLUG CONNECTOR

CROSS-REFERENCE TO RELATED APPLICATIONS

This application claims the benefit of the filing date under 35 U.S.C. § 119(a)-(d) of French Patent Application No. 2107297, filed on Jul. 6, 2021.

FIELD OF THE INVENTION

The present invention relates to a plug connector and, more particularly, to a sealed cable feedthrough of a plug connector.

BACKGROUND

In electric or hybrid vehicles, vehicles are propelled exclusively or partly by one or more electric motors. It may be powered by electrical storage devices, such as a rechargeable battery.

There are several vehicle charging plug standards adapted to the geographical area in which the vehicle is marketed. For example, it is known to use a combined charging system (CCS) to quickly charge an electric vehicle with direct current (DC). This type of charging socket can have both DC and single or three-phase alternating current (AC) pins. A DC power supply allows for relatively fast, and therefore advantageous, battery recharging due to its electrical power: at least 150 kW and a voltage of more than 400V.

An example of a vehicle charging plug 1 known from the state of the art is illustrated in FIG. 1A and FIG. 1B. The vehicle charging plug 1 comprises a plug-in interface 3 provided with a plurality of power contact chambers 5 for receiving AC contacts and DC contacts therein. The AC contacts and DC contacts are crimped or welded to respective AC and DC cables. The interface is mounted on a housing 7 of the vehicle charging plug 1. The vehicle charging plug 1 comprises a sealed cable feedthrough 9 for the passage of DC+ and DC− cables towards an inside cavity 11A of the housing 7 through on opening 11 of the housing 7, as shown in FIG. 1B. The sealed cable feedthrough 9 comprises a cover 13 configured to be attached to the housing 7 and to partially close the opening 11 of the housing 7. The cover 13 comprises two through holes 15 configured to respectively receive the DC+ cable and the DC− cable along an insertion direction D. As shown in the cross-sectional view of FIG. 1B, the openings 15 of the cover 13 are respectively surrounding by a tubular shape 19 of height H for guiding each DC cable. The height H corresponds to the length of the tubular shape 19 from a base 21 of the cover 13 along the insertion direction D.

The sealed cable feedthrough 9 further comprises a seal member 17 configured to seal an interface between the housing 7 and the cover 13. The seal member 17 is sandwiched between the cover 13 and retention device 23 of the housing 7, as shown in FIG. 1B.

The tubular shapes 19 do not allow bending the DC cables closer than from a distance H with respect to the base 21 of the cover 13. The compactness of the vehicle charging plug 1 is thus limited by the height H of the tubular shapes 19 of the cover 13. Reducing the height H of the tubular shapes 19 may, however, negatively impact the sealing performance of the sealed cable feedthrough 9.

SUMMARY

A sealed cable feedthrough of a plug connector includes a housing having an opening receiving a cable, a cover partially covering the opening, the cover having a through hole receiving the cable along an insertion direction, and a seal member sealing an interface between the housing and the cover. The seal member has a tubular member with a through hole receiving the cable along the insertion direction. The tubular member is arranged within the through hole of the cover and extends along a direction parallel to the insertion direction. The tubular member seals an interface between the cover and the cable.

BRIEF DESCRIPTION OF THE DRAWINGS

The invention will now be described by way of example with reference to the accompanying Figures, of which.

DETAILED DESCRIPTION OF THE EMBODIMENT(S)

Features and advantages of the present invention will be described with reference to the drawings. In the description, reference is made to the accompanying figures that are meant to illustrate embodiments of the invention. It is understood that such embodiments do not represent the full scope of the invention.

Figure 1A:
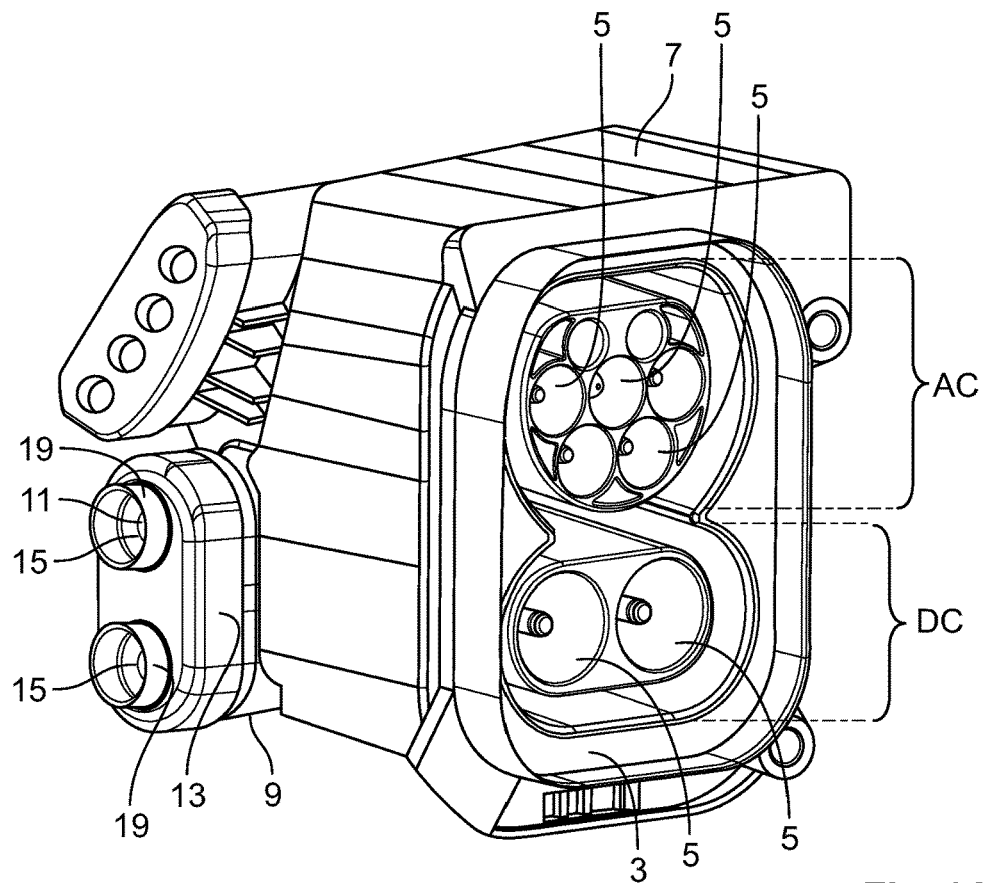
FIG. 1A is a perspective view of a vehicle charging plug known in the art.
Figure 1B:
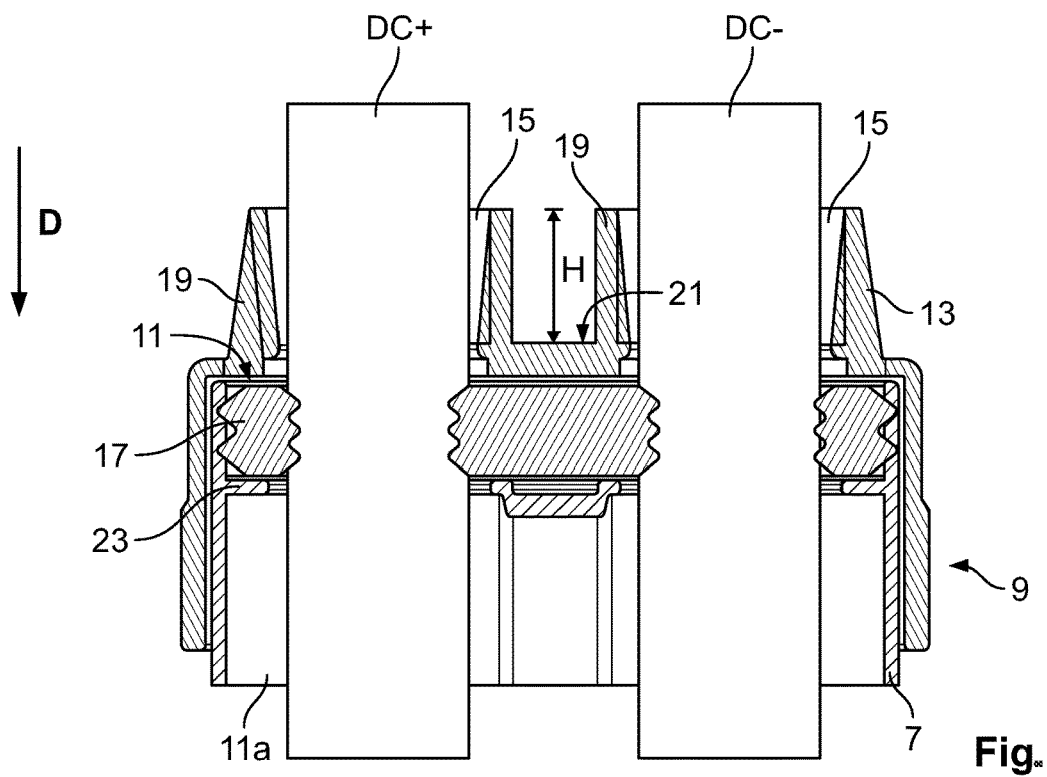
FIG. 1B is a sectional top view of a sealed cable feedthrough of the vehicle charging plug of FIG. 1A.
Figure 2A:
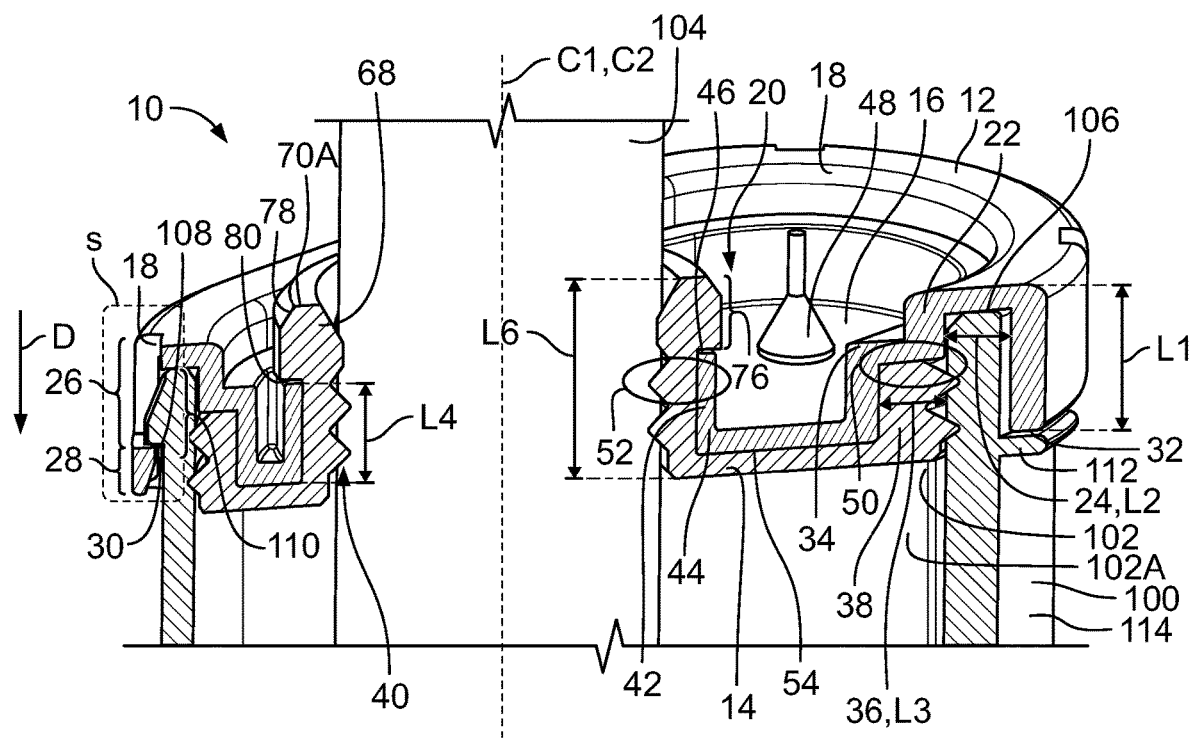
FIG. 2A is a sectional perspective view of an assembly for a cable outlet according to an embodiment of the present invention.
Figure 2B:
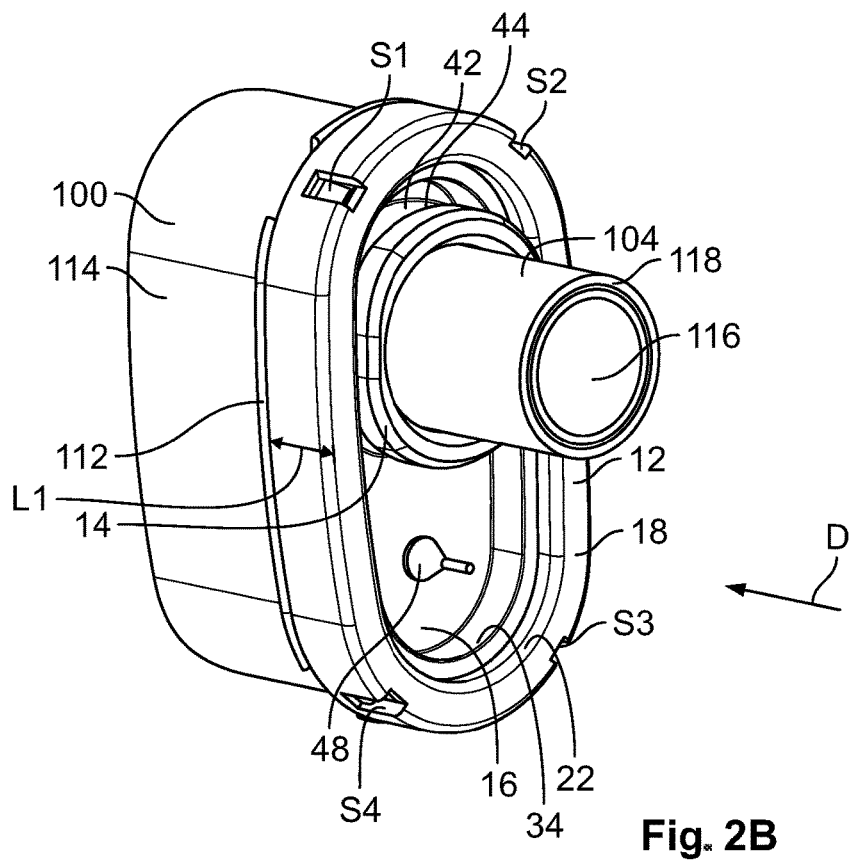
FIG. 2B is a perspective view of the assembly of FIG. 2A.

FIG. 2A and FIG. 2B represent a sealed cable feedthrough 10 of a plug connector according to a first embodiment, in particular of an electric or hybrid vehicle charging plug as shown in FIG. 1A. FIG. 2A represents a cross-sectional view of the sealed cable feedthrough 10, while FIG. 2B represents a three-dimensional view of the sealed cable feedthrough 10. The sealed cable feedthrough 10 is described in the following in reference to both FIG. 2A and FIG. 2B.

The sealed cable feedthrough 10 comprises a cover 12 and a seal member 14. The cover 12 is configured to be attached to a housing 100, in particular a DC cable housing 100 of a vehicle charging plug. The cover 12 is made of a rigid plastic material and is integrally formed, in particular by plastic injection molding.

The housing 100 comprises an opening 102 (only visible in FIG. 2A) for the passage of one cable 104 along an insertion direction D. The insertion direction D is oriented towards the opening 102 of the housing 100. The opening 102 is in communication with an open cavity 102A of the housing 100.

The opening 102 and the cavity 102A are designed and dimensioned for receiving the cable 104 and a terminal contact crimped to the cable 104. The cover 12 is designed with a complementary shape of the opening 102 of the housing 100. The cable 104 can be an insulated electric DC cable.

As shown in FIGS. 2A and 2B, the cover 12 comprises a base 16. The shape of the base 16 is complementary to a cross-sectional shape of the opening 102. In the illustrated example of FIG. 2A and FIG. 2B, the base 16 is a flat and oblong base 16. The base 16 of the cover 12 is enclosed by a rim 18 so as to form a recess 20, i.e. an open cavity 20, between the base 16 and the rim 18. The rim 18 extends perpendicularly from the base 16 along a whole circumference of the base 16, as shown in FIG. 2B. The rim 18 of the cover 12 has a height L1. As shown in FIG. 1A, the base 16 is arranged with respect to the rim 18 such that the base 16 of the cover 12 is positioned away from a free end 106 of the housing 100. The base 16 is indeed located within the opening 102, in particular within the cavity 102A at a distance from the free end 106 of the housing 100, said distance being equivalent to the height L1 of the rim 18. By positioning the base 16 of the cover 12 within the opening 102 inside the housing 100, a more compact the sealed cable feedthrough 10 along the insertion direction can be obtained.

The rim 18 can rest on a wall delimiting the opening 102 of the housing 100, and the base 16 is positioned within the opening 102 inside the housing 100. Thereby, it allows reducing the footprint of the cover 12, which is not formed by a full and solid plastic part thanks to the presence of the recess 24. The shape of the recess 24 allows to provide a more compact cover 12.

The cover 12 is provided with a first shoulder 22 between the base 16 and the rim 18. It allows forming a groove 24 of width L2, i.e. a recess 24 of width L2, shown in FIG. 2A, along a circumference of the cover 12. The groove 24 is adapted for receiving the free-end 106 of the housing 100 (only visible in FIG. 2A). The width L2 of the groove 24 is thus adapted to the dimension of the free-end 104 of the housing 100. The accommodation of the free-end 104 of the housing 100 in the groove 24 of the cover 12 allows connecting to the cover 12 to the housing 100, in particular by a form-fit connection.

To improve further the retention of the cover 12, as illustrated in FIG. 2A, at least one snap-fit connection S is provided between the cover 12 and the housing 100. To provide the snap-fit connection S, the rim 18 of the cover 12 has a deflection member 26 extending along the insertion direction D and ending with a retaining member 28. The retaining member 28 comprises a retention face 30 configured to abut, or rest, on a retention face 108 of a corresponding retaining member 110 of the free-end 106 of the housing 100. In the example illustrated in FIG. 2B, snap-fit connections S1, S2, S3, S4 are provided in four locations of the sealed cable feedthrough 10. However, the number of snap-fit connections S between the cover 12 and the housing 100 is not limited to the shown embodiment.

The retention of the cover 12 can be further improved by an abutment of a free-end 32 of the rim 18 of the cover 12 on a protuberance 112 extending perpendicularly from an external face 114 of the housing 100 at least partially around a circumference of the housing 100, shown in FIG. 2A.

The cover 12 has a second shoulder 34 between the first shoulder 22 and the base 16. It allows forming a groove 36 of width L3, i.e. a recess 36 of width L3, along a circumference of the cover 12, adapted for receiving a portion 38 of the seal member 14 (visible in FIG. 2A). The width L3 of the groove 36 (indicated in FIG. 2A) is thus adapted to the dimension of the portion 38 of the seal member 14. The width L3 of the groove 36 can vary along the circumference of the cover 12. The dimension of the portion 38 of the seal member 14 can thus vary accordingly. The accommodation of the portion 38 of the seal member 14 in the groove 36 of the cover 12 allows connecting the cover 12 to the seal member 14, in particular by a form-fit connection. The groove 36 of the seal member 14 allows a part of the seal member 14, i.e. the portion 38, to be interlocked with the cover 12. Hence, the seal member 14 can be held to the cover 12, which could not be achieved in the state of the art, wherein the seal member 14 is simply juxtaposed to a flat surface of the cover against a flat surface of the seal member 14.

The base 16 of the cover 12 has a through hole 40 configured to receive the cable 104 along the insertion direction D. The cable 104 can be a DC power cable for a vehicle charging plug. The cable 104, as shown in FIG. 2B, comprises an inner conductor 116 and is surrounding by an elastomeric insulating sheath 118.

The through hole 40 of the cover 12 is surrounded by a tubular shape 42 extending perpendicularly from the base 16 in an opposite direction of the insertion direction D. The tubular shape 42 serves for guiding the cable 104. A central longitudinal axis C1 of the tubular shape 42 is aligned with a central axis C2 of the through hole 40 along the insertion direction D.

The tubular shape 42 is formed by a circular wall 44 of height L4 terminated by a circular free edge 46. The height L4 corresponds to the length between the base 16 and the free edge 46 along the insertion direction D, as indicated in FIG. 2A. The height L4 further corresponds to the depth L4 of the through hole 40 of the cover 12.

According to the first embodiment, the height L4 of the tubular shape 42 of the cover 12 is less than the height L1 of the rim 18 of the cover 12 in the insertion direction D. In a variant, the height L4 can be equal to the height L1 of the rim 18 of the cover 12 in the insertion direction D.

Therefore, the tubular shape 42 does not protrude outwardly from the rim 18 of the cover 12. Hence, according to the first embodiment, the greatest thickness of the cover 12 of the sealed cable feedthrough 10 along the insertion direction D corresponds to the height L1 of the rim 18.

The base 16 of the cover 12 can be provided with a further through hole, distinct from the through hole 40, and configured to receive a retaining member 48 of the seal member 14.

In the following, the seal member 14 is described in reference to FIG. 2A, FIG. 2A together with FIG. 3, which represents a three-dimensional view the seal member 14 according to the first embodiment.

The seal member 14 is configured to seal a first interface 50 between the cover 12 and the housing 100 and a second interface 52 between the tubular shape 42 of the cover 12 and the cable 104, as indicated by two circles 50, 52 in FIG. 2A.

The seal member 14 is integrally formed in an elastomeric material, such as rubber. The seal member 14 is a distinct part from the cover 12. In other words, the seal member 14 and the cover 12 are separately formed.

Figure 3:
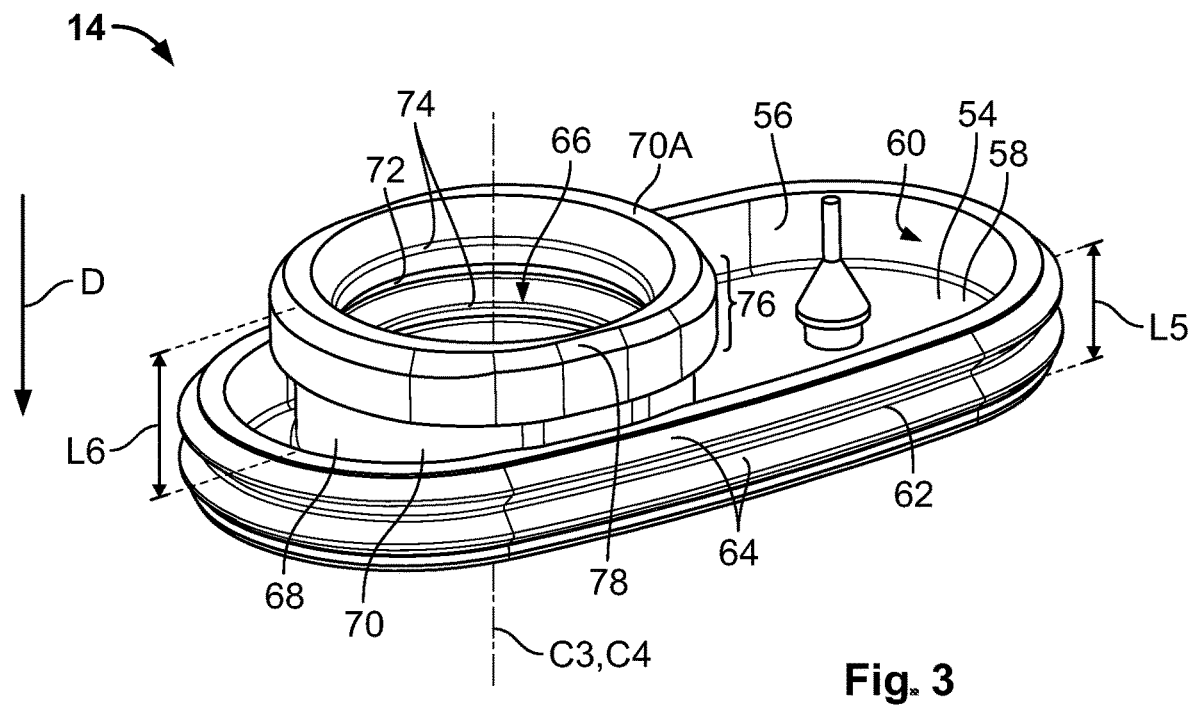
FIG. 3 is a perspective view of a seal member according to an embodiment.

As shown in FIG. 3, the seal member 14 comprises a base 54, in particular a flat and oblong base 54. The geometry and the dimension of the base 54 of the seal member 14 is complementary to the dimensions of the cover 12 and the housing 100, in particular the opening 102 and the cavity 102A of the housing 100.

A rim 56 of height L5 extends perpendicularly from a face 58 of the base 54 along a circumference of the seal member 14 thereby forming a recess 60, i.e. an open cavity 60, as shown in FIG. 3. The height L5 of the rim 56 is adapted to the dimension of the groove 36 of the cover 12, wherein the rim 56 is foreseen to be accommodated thereinto, as shown in FIG. 2A. Indeed, the portion 38 of the seal member 14 described above corresponds to the rim 56 of the seal member 14. An external wall 62 of the rim 56 is provided with two sealing lips 64 for providing sealing properties at the first interface 50 between the cover 12 and the housing 100. The number of sealing lips 64 is not limitative.

The base 54 of the seal member 14 is provided with a through hole 66 configured to receive the cable 104 along the insertion direction D, as shown in FIG. 3. The through hole 66 of the seal member 14 is surrounded by a tubular member 68 extending perpendicularly from the face 58 of the base 54 in an opposite direction of the insertion direction D. A central longitudinal axis C3 of the tubular member 68 of the seal member 14 is aligned with a central axis C4 of the through hole 66 along the insertion direction D.

The tubular member 68 is formed by a circular wall 70, defined around an axis parallel to the insertion direction D, of height L6 terminated by a circular free edge 70A. The height L6 corresponds to the length between the base 54 of the seal member 14 and the free edge 70A along the insertion direction D. The height L6 further corresponds to the depth L6 of the through hole 66 of the seal member 14.

According to the first embodiment, the height L6 of the tubular member 68 of the seal member 14 is greater than the height L4 of the tubular shape 42 of the cover 12 in the insertion direction D. Hence, the tubular member 68 of the seal member 14 protrudes outwardly from the free edge 46 of the tubular shape 42 of the cover 12, as shown in FIG. 2A.

As shown in FIG. 2A, the circular wall 70 of tubular member 68 of the seal member 14 is adapted to extend along the circular wall 44 of the tubular shape 42 of the cover 12 in the insertion direction D, thereby providing sealing properties at the through hole 40 of the cover 12.

An inner wall 72 of the tubular member 60 comprises sealing lips 74 for providing sealing properties at the second interface 52 between the tubular shape 42 of the cover 12 and the cable 104. The number of sealing lips 74 is not limited to the shown embodiment.

In an embodiment, the tubular member 68 of the seal member 14 can extend from one side of the cover 12 at least up to an opposite side of the cover 12. Thereby, the entire depth of the through hole 40 is surrounded by the tubular member 68 of the seal member 14. The sealing properties of the sealed cable feedthrough 10 can thus be further improved.

The free edge 70A of the seal member 14 forms an outwardly protruding a retention element 76 for retaining the seal member 14 to the cover 12 in the insertion direction D by a snap-fit connection.

The free edge 70A is chamfered to provide the retention element 76 with an insertion face 78, so as to ease the insertion of the tubular member 68 of the seal member 14 within the tubular shape 42 of the cover 12 in an opposite direction to the insertion direction D.

The retention element 76 further comprises a retention face 80 configured to rest on the free-edge 46 of the tubular shape 42 of the cover 12, as shown in FIG. 2A. Thereby, the seal member 14 is interlocked by a snap-fit connection with the cover 12 in the insertion direction D.

The abutment of the retention element 76 on the free-edge 46 of the tubular shape 42 of the cover 12 also allows avoiding a winding up of the circular wall 70 of the tubular member 68 of the seal member 14. An involuntary displacement of the seal member 14 in the insertion direction can be avoided by an abutment of the retention element 76 against the edge 46.

To further improve the retention of the seal member 14 to the cover 12, the seal member 14 comprises at least one retaining member 48 configured to be snap-fitted within a though hole of the cover 12, distinct from the through hole 40. The number of retaining member 48 is not limited to the shown embodiment.

The arrangement of the tubular member 68 of the seal member 14 within the tubular shape 42 of the cover 12 allows reducing the depth L4 of the through hole 40 of the cover 12 while fulfilling the sealing performance requirement. Indeed, according to the first embodiment, and in contrast with the state of the art, the depth L4 is less than the height L1 of the rim 18 of the cover 12, said height L1 corresponding to the maximum thickness of the cover 12 of the sealed cable feedthrough 10 along the insertion direction D. Consequently, a more compact sealed cable feedthrough 10 is achieved because the overall thickness of the cover 12 along the insertion direction D can be reduced.

The arrangement of the seal member 14 within the cover 12 according to the first embodiment also allows bending the cable 104 closer to the opening 102 of the housing 100 than in the state of the art. A less cumbersome sealed cable feedthrough 10 can thus be obtained. The retention element 76 can absorb the strains caused by the movement of the cable 104. Hence, the sealed cable feedthrough 10 can be rendered more robust.

Moreover, the formation of a gap between the cable 104 and the seal member 14, when the cable 104 is bent, can be avoided because, at the through hole of the cover 12, the cable 104 is surrounded by the tubular member 68 of the seal member 14. Hence, the cable 104 is in direct surface contact with the tubular member 68 of the seal member 14 within the through hole 66 of the cover 12. Therefore, the sealing performance of the assembly can also be improved.

Moreover, when the cable 104 is bent, the generated strain can directly be absorbed by the seal member 14 inserted directly between the sheath 118 of the cable 104 and the tubular shape 68 of the cover 12.

Furthermore, the snap-fit connection of the seal member 14 with the cover 12 prevents a rotation of the seal member 14 during the assembly or the operation.

Figure 4:
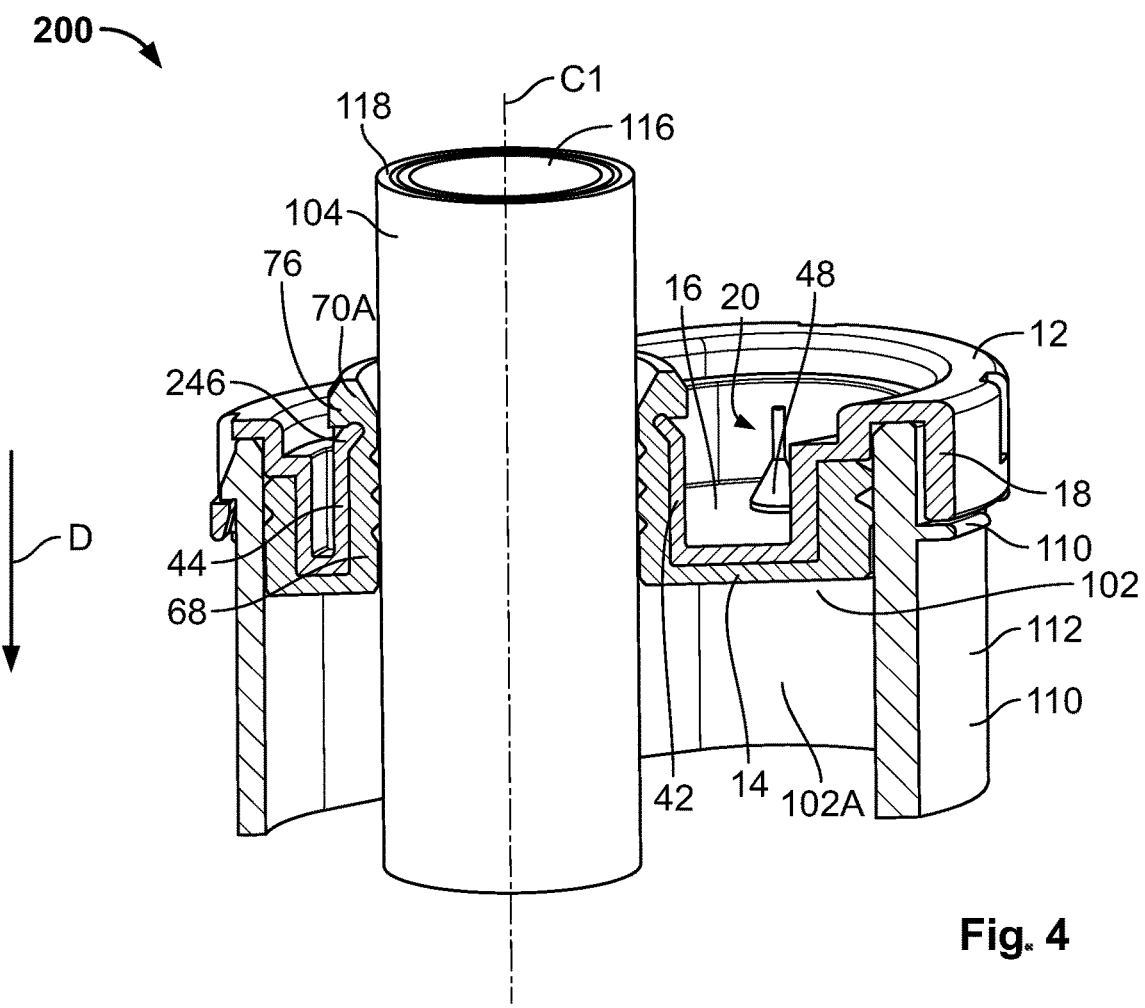
FIG. 4 is a sectional perspective view of an assembly for a cable outlet according to another embodiment.

FIG. 4 represents a cross-sectional view of a sealed cable feedthrough 200 according to a second embodiment of the present invention. Only the distinctive features with respect to the first embodiment will be described. Elements with the same reference sign already described and illustrated in FIG. 2A, FIG. 2B and FIG. 3 will not be described in detail again but reference is made to their description above.

The difference between the sealed cable feedthrough 10 according to the first embodiment and the sealed cable feedthrough 200 according to the second embodiment relates to the free-edge (indicated by the reference sign 46 in the first embodiment, and 246 in the second embodiment) of the circular wall 44 of the tubular shape 68 of the cover 12.

In the second embodiment, the free edge 246 is inclined at about 45 degrees to the central longitudinal axis C1 of the tubular shape 42 of the cover 12 with respect to the circular wall 44 with respect to the insertion direction D. It allows improving further the retention of the seal member 14 to the cover 12.

Figure 5A:
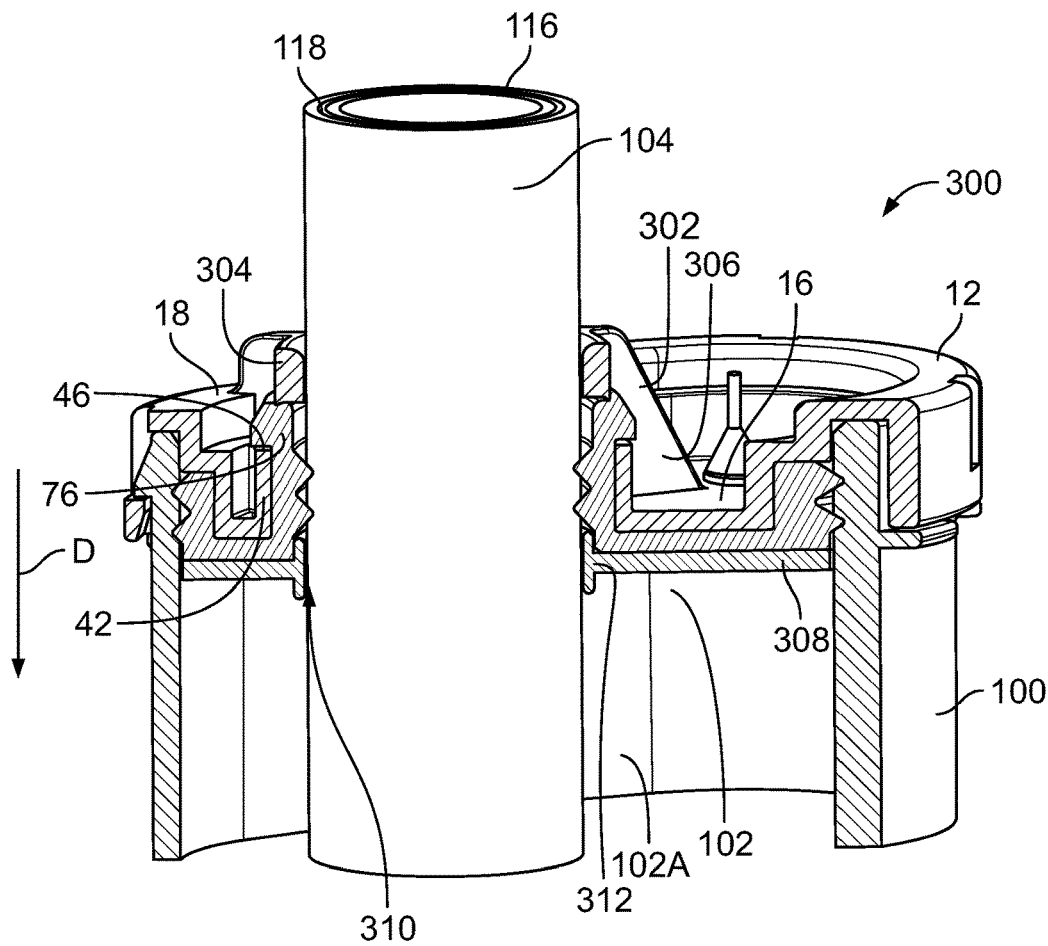
FIG. 5A is a sectional perspective view of an assembly for a cable outlet according to another embodiment.
Figure 5B:
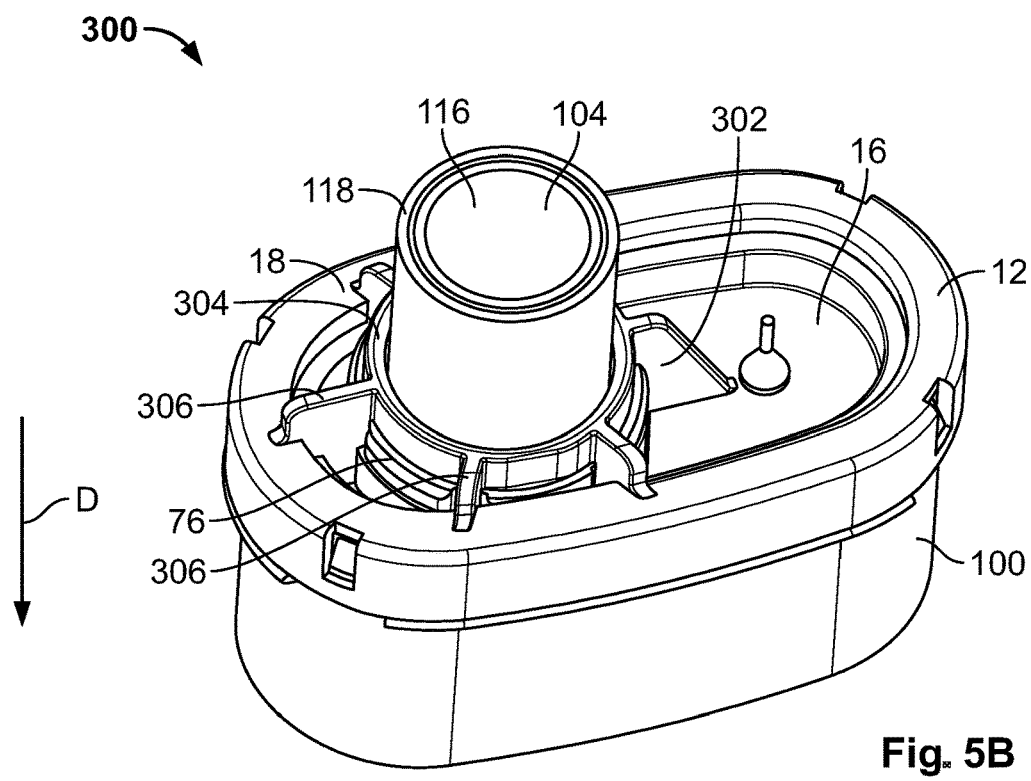
FIG. 5B is a perspective view of a seal member according to another embodiment.

FIG. 5A and FIG. 5B represent a sealed cable feedthrough 300 according to a third embodiment of the present invention. Only the distinctive features with respect to the first embodiment and the second embodiment will be described. Elements with the same reference sign already described and illustrated in FIG. 2A, FIG. 2B, FIG. 3 and FIG. 4 will not be described in detail again but reference is made to their description above.

In comparison to the first embodiment and the second embodiment, in the third embodiment the cover 12 is further provided with a holding structure 302. The holding structure 302 is integrally formed with the cover 12, for example by injection molding.

The holding structure 302 protrudes outwardly from the base 16 of the cover 12 in an opposite direction of the insertion direction D and from the rim 18 of the cover 12 towards the recess 20 of the cover 12. Hence, the holding structure 302 is well mechanically supported and anchored to the cover 12, and can be integrally formed with the cover 12, in particular by plastic injection molding. Thus, a robust cover 12 is provided.

The holding structure 302 comprises a ring 304 adapted for surrounding the cable 104. The ring 304 provides a retention function to the cable 104, in particular by positive locking, and allows improving the robustness of the sealed cable feedthrough 300. The ring 304 is mechanically connected to the base 16 and to the rim 18 of the cover 302 by a plurality of reinforcing elements 306 allowing consolidating the holding structure 302. The number of reinforcing elements 306 is not limitative.

As shown in FIG. 5A, the retention element 76 of the seal member 14 is interlocked between the free edge 46 of the tubular shape 42 of the cover 12 and the ring 304 of the cover 12. It allows improving further the retention of the seal member 14 to the cover 12 as well as the robustness of the sealed cable feedthrough 300.

The ring 304 protrudes outwardly from the rim 18 in an opposite direction of the insertion direction D. Hence, in the third embodiment, and in comparison with the first embodiment and the second embodiment, the cable 104 bends a bit further away from the opening 102 of the housing 100, but closer than the known sealed cable feedthrough from the state of the art. Thus, the sealed cable feedthrough 300 according to the third embodiment also provides the advantage of a less cumbersome sealed cable feedthrough.

In the third embodiment, the sealed cable feedthrough 300 further comprises a grid 308 (only visible in FIG. 5A). The grid 308 has an essentially flat and oblong shape adapted to the dimension of the opening 102 of the housing 100. The grid 308 is provided with a through hole 310 for receiving the cable 104. As shown in FIG. 5A, the grid 308 is positioned in surface contact with an opposite face 82 of the face 58 of the base 54 of the seal member 14. The through hole 310 of the grid 308 is surrounded by a circular wall 312. The circular wall 312 extends parallel to the insertion direction D. The circular wall 312 provides a guiding function to the cable 104. The circular wall 312 is inserted between the sheath 118 of the cable 104 and the seal member 14 to further provide a retention function. The grid 308 also allows improving the robustness of the sealed cable feedthrough 300.

In a variant, not represented, the grid 308 can comprise a through hole for receiving a retaining member 48 of the seal member 14 to further improve the retention of the seal member 14 with the grid 308. The number of retaining member 48 (and corresponding through hole in the grid 308) is not limited to the shown embodiment.

A grid 308 can be provided in the sealed cable feedthrough 10, 200 according to the first and the second embodiments.

The present invention also relates by an assembly of the cover 12 and the seal member 14 as described above, wherein the seal member 14 is snap-fitted to the cover 12. Hence, the seal member 14 can be retained by a snap-fit connection to the cover 12 even before the cover 12 is attached to the housing 100. Thus, an operator must only manipulate one element, i.e. an assembly of the seal member 14 and the cover 12, instead of manipulating them distinctly. The assembly process can therefore be simplified. Moreover, as the seal member 14 is usually lubricated by oil, it also allows reducing oil pollution by manipulating only the cover 12 (which is not lubricated), instead of the lubricated seal member 14 directly. The seal member 14 is indirectly manipulated via the cover 12 thanks to the snap fit connection. Oil pollution can thus be advantageously reduced. Furthermore, the cover 12 allows protecting from pollution the face 48 of the seal member 14 in surface contact with one side of the cover 12 (as shown in FIG. 2A), even before the cover 12 is attached to the housing 100.

Although the embodiments have been described in relation to particular examples, the invention is not limited and numerous alterations to the disclosed embodiments can be made without departing from the scope of this invention. The various embodiments and examples include individual features can be freely combined with each other to obtain further embodiments or examples according to the invention.

What is claimed is:

1. A sealed cable feedthrough of a plug connector, comprising:
    a housing having an opening receiving a cable;
    a cover partially covering the opening, the cover having a through hole receiving the cable along an insertion direction; and
    a seal member sealing an interface between the housing and the cover, the seal member has a tubular member with a through hole receiving the cable along the insertion direction, the tubular member is arranged within the through hole of the cover and extends along a direction parallel to the insertion direction, the tubular member seals an interface between the cover and the cable, the seal member is snap-fitted to the cover.

2. The sealed cable feedthrough of claim 1, wherein the tubular member extends from a side of the cover to an opposite side of the cover.

3. The sealed cable feedthrough of claim 1, wherein the tubular member extends perpendicularly from a base of the seal member.

4. The sealed cable feedthrough of claim 3, wherein the tubular member has a free-end terminated by a retention element protruding outwardly and retaining the seal member to the cover in the insertion direction.

5. The sealed cable feedthrough of claim 4, wherein the retention element abuts in the insertion direction on a free-edge of a wall delimiting the through hole of the cover.

6. The sealed cable feedthrough of claim 4, wherein the cover has a holding structure retaining the retention element in an opposite direction of the insertion direction.

7. The sealed cable feedthrough of claim 1, wherein the cover has a base enclosed by a rim and forming a recess between the base and the rim.

8. The sealed cable feedthrough of claim 7, wherein the rim rests on a wall delimiting the opening of the housing, the base of the cover is positioned within the opening inside the housing.

9. The sealed cable feedthrough of claim 7, wherein the cover has a holding structure protruding outwardly from the base in an opposite direction of the insertion direction and/or protruding from the rim of the cover toward the recess of the cover.

10. The sealed cable feedthrough of claim 7, wherein a depth of the through hole of the cover in the insertion direction is less than or equal to a height of the rim of the cover in the insertion direction.

11. The sealed cable feedthrough of claim 7, wherein the cover has a first shoulder between the base and the rim.

12. The sealed cable feedthrough of claim 11, wherein the cover has a second shoulder between the first shoulder and the base of the cover.

13. The sealed cable feedthrough of claim 12, wherein the seal member has a base enclosed by a rim forming a recess between the base and the rim.

14. The sealed cable feedthrough of claim 13, wherein the rim of the seal member is arranged in a recess of the cover formed between the first shoulder and the second shoulder.

15. The sealed cable feedthrough of claim 1, wherein the cover and the seal member are two distinct pieces each integrally formed, the cover is made of a rigid material and the seal member is made of an elastomeric material.

16. The sealed cable feedthrough of claim 1, further comprising a grid arranged in the opening of the housing to retain the seal member in the insertion direction by a snap-fit connection between the grid and the seal member.

17. The sealed cable feedthrough of claim 1, wherein the housing, the cover, and the seal member receive only a single cable.

18. An assembly, comprising:
   a cover having a through hole; and
   a seal member having a tubular member with a through hole receiving a cable along an insertion direction, the tubular member is arranged within the through hole of the cover and extends along a direction parallel to the insertion direction, the tubular member seals an interface between the cover and the cable, the seal member is snap-fitted to the cover.

19. A sealed cable feedthrough of a plug connector, comprising:
   a housing having an opening receiving a cable;
   a cover partially covering the opening, the cover having a through hole receiving the cable along an insertion direction, the cover has a base enclosed by a rim and forming a recess between the base and the rim; and
   a seal member sealing an interface between the housing and the cover, the seal member has a tubular member with a through hole receiving the cable along the insertion direction, the tubular member is arranged within the through hole of the cover and extends along a direction parallel to the insertion direction, the tubular member seals an interface between the cover and the cable.

20. A sealed cable feedthrough of a plug connector, comprising:
   a housing having an opening receiving a cable;
   a cover partially covering the opening, the cover having a through hole receiving the cable along an insertion direction;
   a seal member sealing an interface between the housing and the cover, the seal member has a tubular member with a through hole receiving the cable along the insertion direction, the tubular member is arranged within the through hole of the cover and extends along a direction parallel to the insertion direction, the tubular member seals an interface between the cover and the cable; and
   a grid arranged in the opening of the housing to retain the seal member in the insertion direction by a snap-fit connection between the grid and the seal member.

\* \* \* \* \*